(12) United States Patent
Bechman et al.

(10) Patent No.: US 6,359,585 B1
(45) Date of Patent: Mar. 19, 2002

(54) APPARATUS AND METHOD OF DETERMINING AN ORIENTATION OF A GPS RECEIVER

(75) Inventors: Gary S. Bechman; Robert I. Bowen, both of Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/575,878

(22) Filed: May 22, 2000

(51) Int. Cl.[7] .................................................. H01Q 3/00
(52) U.S. Cl. ...................................................... 342/359
(58) Field of Search ....................... 342/357.11, 357.06, 342/359, 417

(56) References Cited

U.S. PATENT DOCUMENTS

| | | | | |
|---|---|---|---|---|
| 5,021,792 A | * | 6/1991 | Hwang | 342/357 |
| 5,146,231 A | * | 9/1992 | Ghaem et al. | 342/419 |
| 5,379,320 A | * | 1/1995 | Fermandes et al. | 375/1 |
| 5,568,152 A | * | 10/1996 | Janky et al. | 342/357 |
| 5,952,968 A | * | 9/1999 | McDowell | 342/383 |
| 6,023,242 A | * | 2/2000 | Dixon | 342/359 |
| 6,043,778 A | * | 3/2000 | Froeberg et al. | 342/357.14 |

* cited by examiner

Primary Examiner—Dao Phan
(74) Attorney, Agent, or Firm—Nathan O. Jensen; Kyle Eppele

(57) ABSTRACT

The present invention is directed to a method of determining an orientation of an object wherein a directional antenna of a global positioning system receiver acquires a position of a global positioning system transmitter. An orientation of the directional antenna of the global positioning system receiver is determined with respect to the global positioning system transmitter, the determined orientation of the direction antenna corresponding to the object so as to enable the orientation of the object to be determined.

20 Claims, 7 Drawing Sheets

APPARATUS AND METHOD OF DETERMINING AN ORIENTATION OF A GPS RECEIVER

BACKGROUND OF THE INVENTION

The present invention generally relates to the field of global positioning system receivers, and more specifically to an apparatus and method of determining an orientation of a global positioning system receiver.

Global positioning system (GPS) receivers provide accurate location, velocity and time information based on specially coded data broadcast from orbiting satellites. Additionally, data may be broadcast from positions on the earth using terrestrial based transmitters transmitting data similar to the specially coded data broadcast from orbiting satellites.

A global positioning system (GPS) receiver may use this data to determine what compass direction the receiver is traveling, such as north, south, east, west, and the like. For example, a global positioning system (GPS) receiver may determine a first location point and a second location point that the receiver is moved to, and then utilize the two points to compute the direction heading. However, a global positioning system (GPS) receiver is not able to determine a compass direction the receiver is headed without some movement of the global positioning system (GPS) receiver. Thus, a stationary global positioning system (GPS) receiver is unable to determine a heading.

Additionally, although the position of the global positioning system receiver is able to be determined utilizing the specially coded data, the orientation of the global positioning system (GPS) receiver at that position is unable to be determined. For example, a typical global positioning system (GPS) receiver is able to determine the location at which the antenna of the global positioning system (GPS) receiver acquired the data, but is not able to determine the orientation of the global positioning system (GPS) receiver at that location, such as facing north in two dimensions, and pitch and roll in three dimensions.

Thus, it would be desirable to provide an apparatus and method of determining an orientation of a global positioning system receiver.

SUMMARY OF THE INVENTION

Accordingly, the present invention is directed to an apparatus and method of determining an orientation of a global positioning system receiver. In a first aspect of the present invention, a method of determining an orientation of an object including a directional antenna of a global positioning system receiver includes acquiring a position of a global positioning system transmitter. An orientation of the directional antenna of the global positioning system receiver is determined with respect to the global positioning system transmitter, the determined orientation of the direction antenna corresponding to the object so as to enable the orientation of the object to be determined.

In a second aspect of the present invention, a method of determining an orientation of a directional antenna of a global positioning system receiver includes acquiring a position of a global positioning system transmitter and resolving a position of a directional antenna of a global positioning system receiver. An orientation of the directional antenna of the global positioning system receiver is determined with respect to the global positioning system transmitter wherein the orientation of the directional antenna with respect to the global positioning system transmitter is suitable for being utilized for determining an orientation of the directional antenna in space.

In a third aspect of the present invention, an apparatus suitable for determining an orientation relative to a global positioning system transmitter includes a global positioning system receiver suitable for resolving a position of the global positioning system receiver by receiving signals from the global positioning system transmitter. The global positioning system receiver is also suitable for acquiring a position of the global positioning system transmitter by receiving signals from the global positioning system transmitter. A directional antenna is also included, the orientation device suitable for determining the orientation of the apparatus with respect to the global positioning system transmitter.

In a fourth aspect of the present invention, a method of determining an orientation of a directional antenna of a global positioning system receiver includes positioning the global positioning system receiver in a known plane. A position of a first global positioning system transmitter and a second global positioning system transmitter is acquired. An orientation is then determined of the directional antenna of the global positioning system receiver with respect to the first global positioning system transmitter and the second global positioning system transmitter.

In a fifth aspect of the present invention, a method of determining an orientation of a directional antenna of a global positioning system receiver includes acquiring a position of a first global positioning system transmitter, a second global positioning system transmitter and a third global positioning system transmitter. An orientation of the directional antenna of the global positioning system receiver is then determined with respect to the first global positioning system transmitter, the second global positioning system transmitter, and the third global positioning system transmitter.

In a further aspect of the present invention, an internal navigation system suitable for use in determining an orientation of a vehicle includes a global positioning system receiver suitable for resolving a position of the global positioning system receiver by receiving signals from a constellation of global positioning system transmitters and also suitable for resolving a position of the global positioning system transmitter by receiving signals from the global positioning system transmitter. A directional antenna is also included, the directional antenna suitable for determining the orientation of the directional antenna with respect to at least one global positioning system transmitter, the determined orientation suitable for figuring the orientation of the vehicle in space.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. Previously, global positioning system receivers were only able to determine direction through movement. Additionally, these receivers were also unable to determine the orientation of the global positioning system receiver in space, such as the position of the global positioning system (GPS) receiver in two dimensions and three dimensions. The present invention addresses these limitations by providing a GPS receiver capable of determining the orientation of the receiver with respect to a GPS transmitter. As used through the specification and claims, a global positioning system (GPS) includes not only the global positioning system operated by the United States, but also the global navigation satellite system (GLONASS), and any other terrestrial based transmitters, satellite based transmitters, and the like without departing from the spirit and scope of the present invention.

Figure 1:
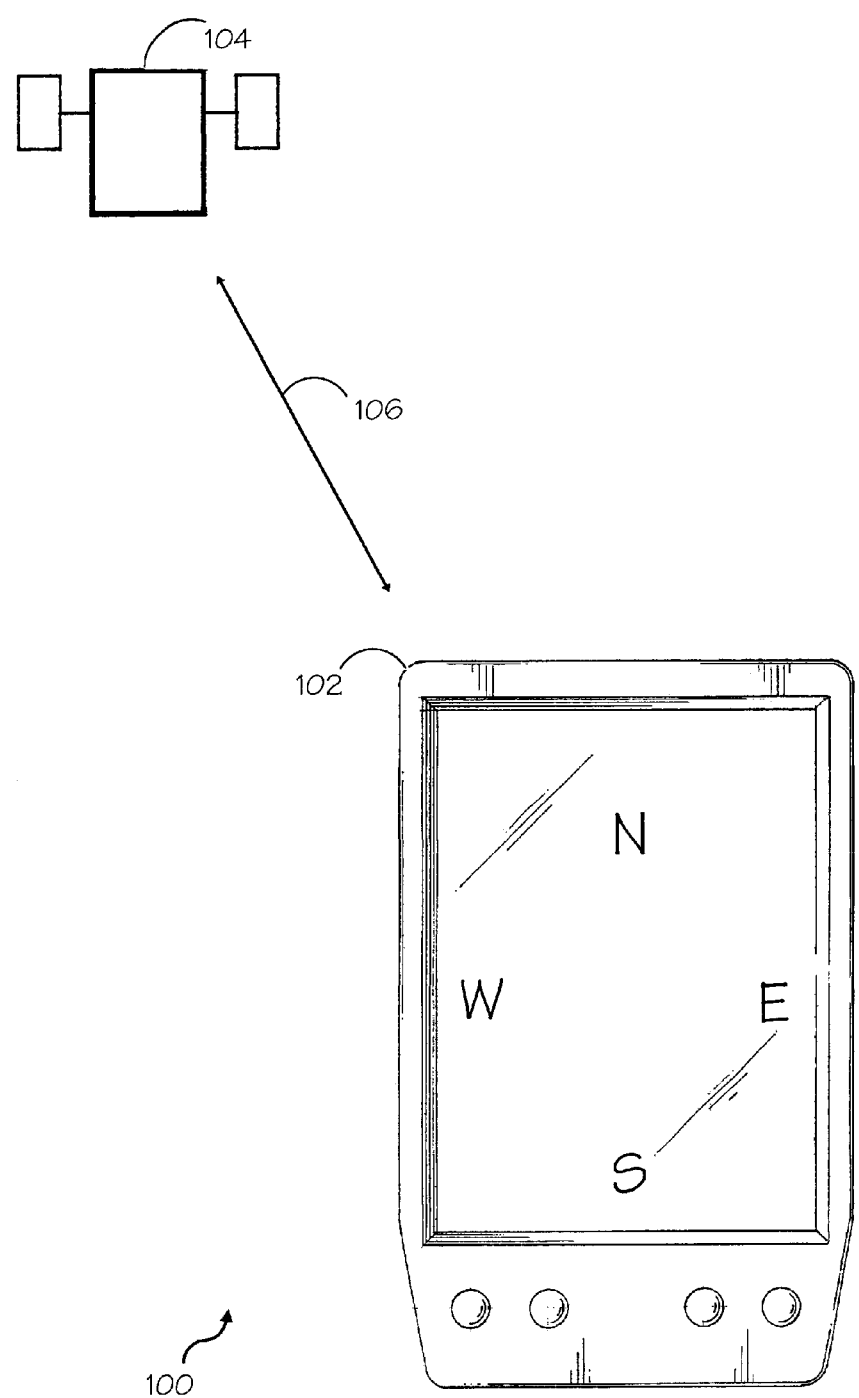
FIG. 1 is an illustration of an exemplary embodiment of the present invention wherein a global positioning system receiver including a directional antenna is capable of determining an orientation with respect to a global positioning system transmitter.

Referring now to FIG. 1, an exemplary embodiment 100 of the present invention is shown wherein a global positioning system receiver including a directional antenna is capable of determining an orientation with respect to a global positioning system transmitter. A global positioning system receiver 102 may receive encoded data from a global positioning system transmitter 104. This encoded data may indicate the position of the global positioning system transmitter 104. Additionally, the global positioning system receiver 102 may receive data from additional GPS transmitters to compute the position of the GPS receiver 102. For instance, the GPS receiver 102 may receive signals from a constellation of GPS transmitters, such as GPS satellite transmitters, terrestrial based GPS transmitters such as pseudolites, and the like.

An orientation device, such as a directional antenna, may be included with the GPS receiver 102 to determine the orientation of the GPS receiver 102 with respect to the GPS transmitter 104. For example, the GPS receiver 102, to determine from which direction the signal 106 is received from the GPS transmitter 104, may utilize a nulling antenna, beam steering antenna, and the like. In this way, the GPS receiver 102 may determine which portion of the directional antenna, and therefore the GPS receiver 102, is facing the GPS transmitter 104. Thus, by knowing the position of the GPS transmitter 104, and the position of the directional antenna of the GPS receiver 102, and from what direction the signal 106 is being received, the orientation of the directional antenna, and therefore the GPS receiver 102 may be determined, such as which portion of the receiver faces up, down, forward, and the like.

Figure 2A:
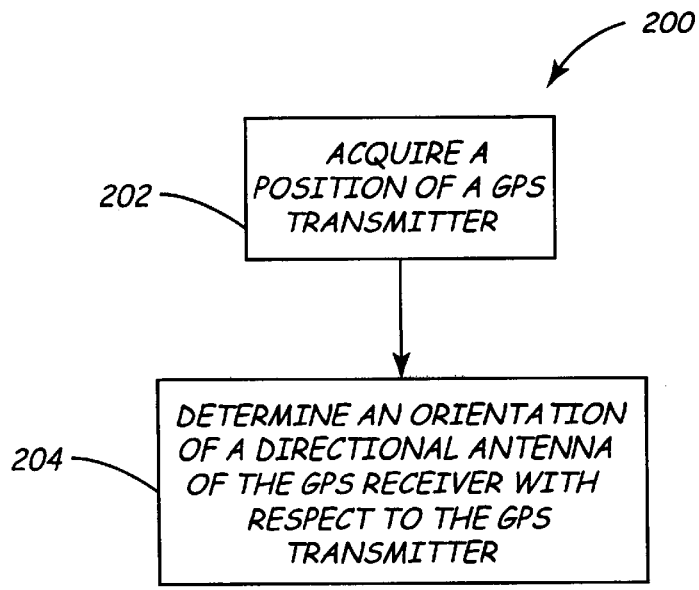
FIG. 2 is a flow diagram depicting an exemplary method of the present invention wherein the orientation of a directional antenna of a global positioning system receiver is determined with respect to a global positioning system transmitter.
Figure 2B:
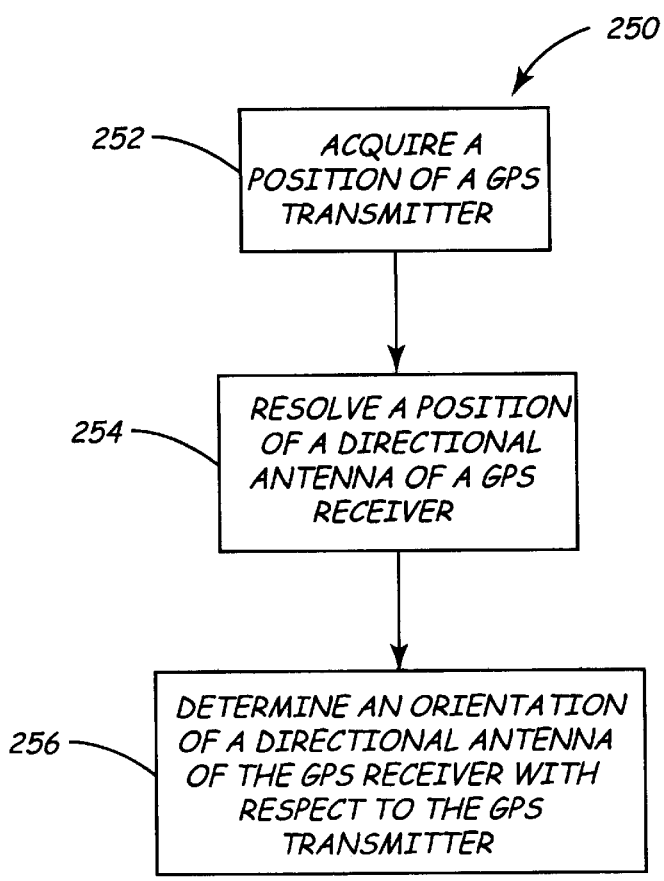

Referring now to FIGS. 2A and 2B, exemplary methods 200 and 250 of the present invention are shown wherein the orientation of a directional antenna of a GPS receiver is determined with respect to a GPS transmitter. A position of a GPS transmitter is acquired 202. An orientation of a directional antenna of a GPS receiver is determined with respect to the GPS transmitter. Thus, by knowing where the GPS receiver had to "look" to find the signal from the GPS transmitter, the orientation of the GPS receiver with respect to the GPS transmitter may be determined. Additionally, the orientation may be utilized to compute where other portions of the GPS receiver are oriented with respect to the GPS transmitter.

In another embodiment 250 of the present invention, the orientation in space of the GPS transmitter may be determined. For example, as shown in FIG. 2B, a position of a GPS transmitter is acquired 252. For instance, the position may be computed from the coded data transmitted by the GPS transmitter. A position of the GPS receiver is resolved 254. For example, the GPS receiver may acquire a position from coded data transmitted from three GPS transmitters to indicate position in two dimensions, or resolved from other data entered into the receiver, such as typed in by a user. A GPS receiver may also acquire a position in three dimensions utilizing four GPS transmitters to compute a position in three dimensions and the time offset in a receiver clock of the GPS receiver.

An orientation of the GPS receiver is then determined with respect to the GPS transmitter 256. For instance, in order for the GPS receiver to determine which portion of the GPS receiver addresses, i.e. faces, the GPS transmitter, the GPS receiver may utilize a directional antenna. Therefore, by knowing where the directional antenna had to "look" to find the signal from the GPS transmitter combined with the positional data, the orientation of the GPS receiver in space may be determined. It should be apparent that a wide variety of methods for locating a position utilizing a GPS system and the like are contemplated by the present invention without departing from the spirit and scope thereof.

Figure 3:
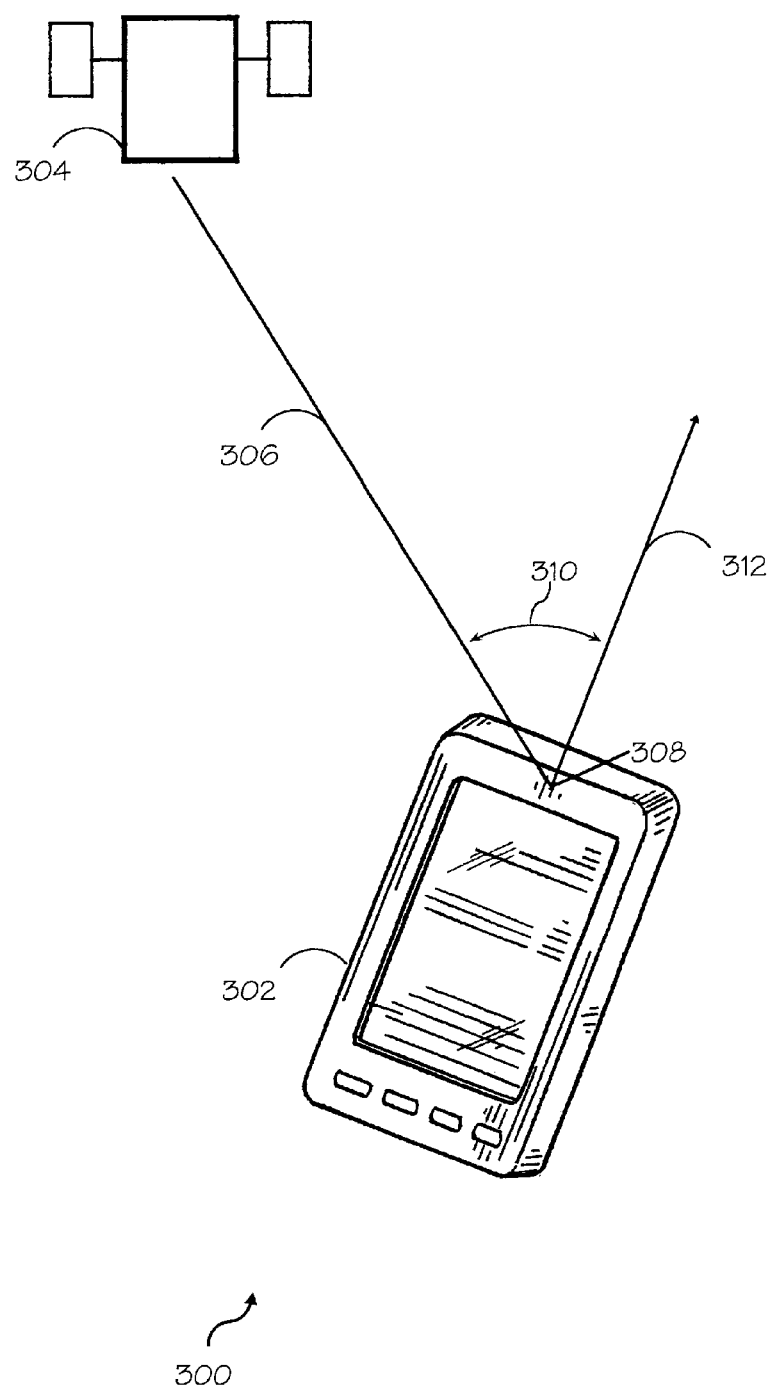
FIG. 3 is an illustration of an exemplary embodiment of the present invention wherein a global positioning system receiver including a directional antenna is capable of determining an orientation with respect to a global positioning system transmitter and utilizes the determined orientation to compute a heading of a reference point.

Referring now to FIG. 3, an exemplary embodiment 300 of the present invention is shown wherein a global positioning system receiver is capable of determining an orientation with respect to a global positioning system transmitter and utilizing the determined orientation to compute a directional alignment of a reference point. A GPS receiver 302 includes a directional antenna, such as an electronic nulling antenna, suitable for determining where a GPS transmitter 304 presently is relative to the Earth and the GPS receiver 302. For example, an electronic nulling antenna may selectively null various headings until the signal 306 is eliminated. Thus, when the signal 306 is blocked at a particular heading, the GPS receiver 302 is able to determine which portion of the GPS receiver 302 faces the GPS transmitter 304.

A reference point 308 may be included to define a heading of the GPS receiver 302. For example, a user may wish to find a compass heading of the GPS receiver 302. To find a compass heading, the GPS receiver 302 may utilize the determined orientation of the GPS receiver 302 with respect to the GPS transmitter 304. For example, the GPS transmitter 304 may be positioned northwest of the GPS receiver 302 with the upper left corner of the GPS receiver 302 facing the GPS transmitter 304. Thus, the GPS receiver 302 has determined that the upper left corner of the GPS receiver 302 faces northwest. A reference point 308 may be calibrated for the nulling antenna so that an angle 310 may be computed between the reference point 308 of the GPS receiver 302 and the GPS transmitter 304. Therefore a directional alignment 312 may be determined for the GPS receiver 302, such as North in the present example. It may also be desirable to enable the reference point 308 to be user definable in the field to provide greater flexibility of operation. For example, a user may wish to define the top of the GPS receiver as the reference point, the side of the GPS receiver, and the like to enable operation and determination of headings in a plurality of directions. Although the position of the GPS receiver is described, it should be apparent that the position of the directional antenna may be utilized to correspond with the GPS receiver so that an orientation detected by the directional antenna may correspond with the position of the GPS receiver.

Figure 4:
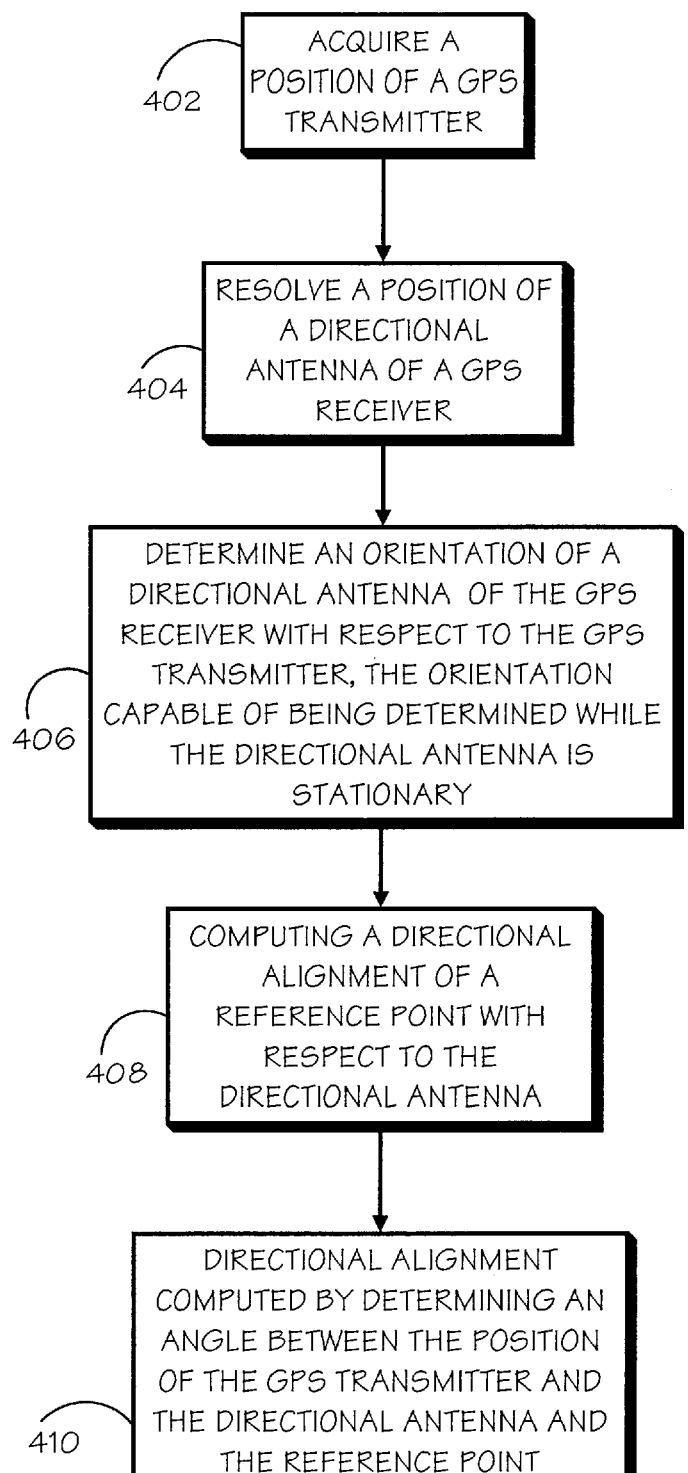
FIG. 4 is a flow diagram depicting an exemplary method of the present invention wherein a global positioning system receiver including a directional antenna is capable of determining an orientation with respect to a global positioning system transmitter and utilizing the determined orientation to compute a heading of a reference point.

Referring now to FIG. 4, an exemplary method 400 of the present invention is shown wherein a global positioning system receiver including a directional antenna is capable of determining an orientation with respect to a global positioning system transmitter and utilizing the determined orientation to compute a directional alignment of a reference point. A position of a GPS transmitter is acquired 402 and a position of a directional antenna of a GPS receiver is resolved 404. An orientation of a directional antenna of the GPS receiver is then determined with respect to the GPS transmitter, the orientation capable of being determined while the GPS receiver is stationary 406. A directional alignment of a reference point is then computed with respect to the GPS receiver 408. The directional alignment may be computed by determining an angle between the position of the GPS transmitter and the GPS receiver and the reference point 410. Thus, the GPS receiver may utilize the determined orientation of the GPS receiver with respect to the GPS transmitter to determine the directional alignment of the GPS receiver, such as a compass heading, vertical heading, and the like. Therefore, the present invention not only provides navigation and orientation in two dimensions, such as compass headings, but also orientation in three dimensions.

Figure 5:
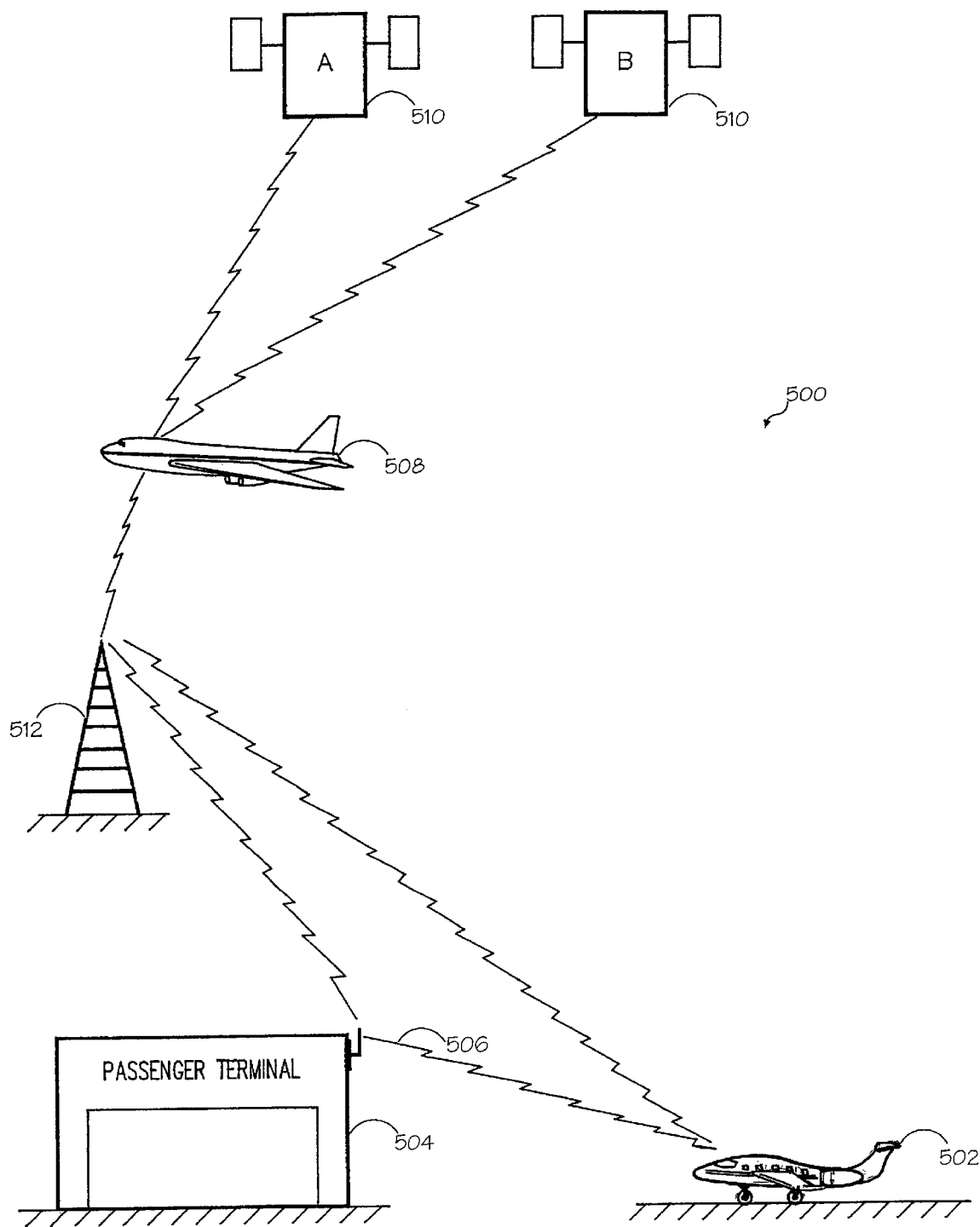
FIG. 5 is an illustration of an exemplary embodiment of the present invention wherein the orientation of a directional antenna of a global positioning system receiver is utilized in both two dimensions and three dimensions.

Referring now to FIG. 5, an additional embodiment 500 of the present invention is shown wherein the orientation of a directional antenna of a global positioning system receiver is utilized in both two dimensions and three dimensions. By knowing the orientation of a directional antenna, and therefore the orientation of the GPS receiver or any other object containing the directional antenna, with respect to the GPS transmitter, an orientation of the GPS receiver or other object including the direction antenna may be determined. For example, a heading of an airplane 502 may be determined for navigation of the airplane 502 on the ground. For instance, the airplane 502 may be headed toward a passenger terminal 504. With the ability of determining the orientation of the airplane 502, directions may be given to the airplane 502 without the requirement of airplane 502 movement. Further, the airplane 502 may communicate 506 its determined orientation to the terminal 504 to enable the terminal 504 to guide the airplane 502 about an airport in an improved manner.

Additionally, an airplane 508 may determine not only its present heading, but also the orientation of the airplane 508, such as pitch and roll of the airplane 508. For instance, it may be determined that the airplane 508 is banking and climbing. This may be determined by knowing the orientation of the plane 508 with respect to GPS transmitters, such as satellites 510 and ground-based transmitters 512. Thus, even in mobile, i.e. non-stationary, applications the present invention provides increased functionality. Additionally, the present invention may be utilized as an internal navigation unit so as to replace traditional gyroscopes and other devices used in determining the orientation of an aircraft. It should be apparent that although the use of the present invention in airplane applications is described, a variety of objects utilized in two-dimensional, three-dimensional, stationary and mobile applications are contemplated.

Figure 6:
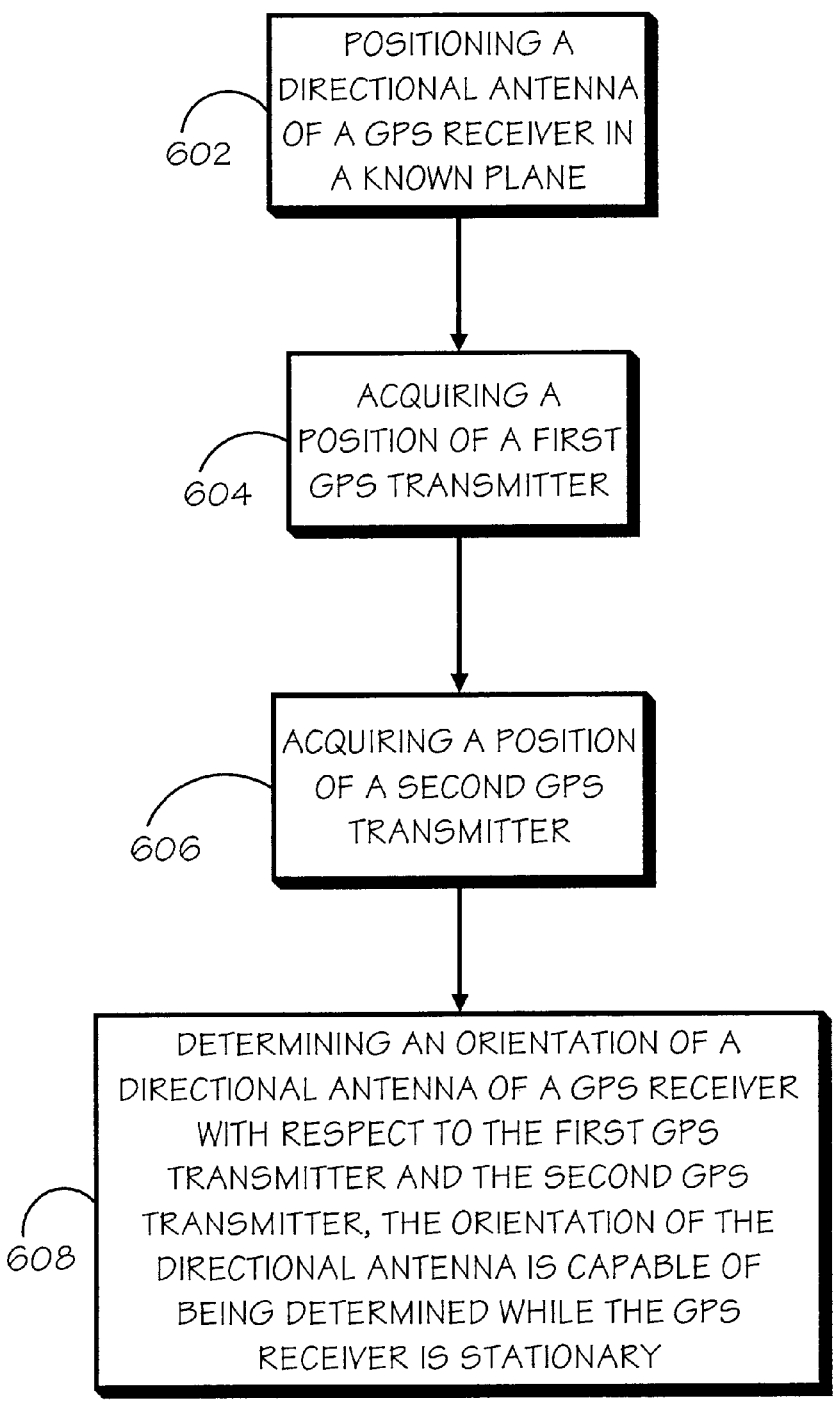
FIG. 6 is a flow diagram illustrating an exemplary method of the present invention wherein a global positioning system receiver including a directional antenna is capable of determining a heading by positioning the directional antenna in a known plane and determining an orientation of the corresponding receiver with respect to two global positioning system transmitters.

Referring now to FIG. 6, an exemplary method 600 of the present invention is shown wherein a global positioning system receiver is capable of determining a heading by positioning the receiver in a known plane and determining an orientation of the receiver with respect to two global positioning system transmitters. A directional antenna coupled to a GPS receiver is positioned in a known plane 602. For example, a GPS receiver configured for hand-held use, an example of which is shown in FIG. 1, may be positioned horizontally to enable a user to view a screen disposed on the receiver. A position of a first GPS transmitter is acquired 604 and the position of a second GPS transmitter is acquired 606. An orientation of the directional antenna of the GPS receiver with respect to the first GPS transmitter and the second GPS transmitter is then determined 608. The orientation of the directional antenna corresponding to the GPS receiver is capable of being determined while the GPS receiver is stationary. Thus, a user viewing the receiver placed in the horizontal plane as previously described is able to view a heading of the GPS receiver, such as a compass heading. Therefore, it is not necessary to know the position of the GPS receiver to determine its orientation with respect to the GPS transmitters. Although a horizontal plane is described, a variety of planes are contemplated by the present invention without departing from the spirit and scope thereof.

Figure 7:
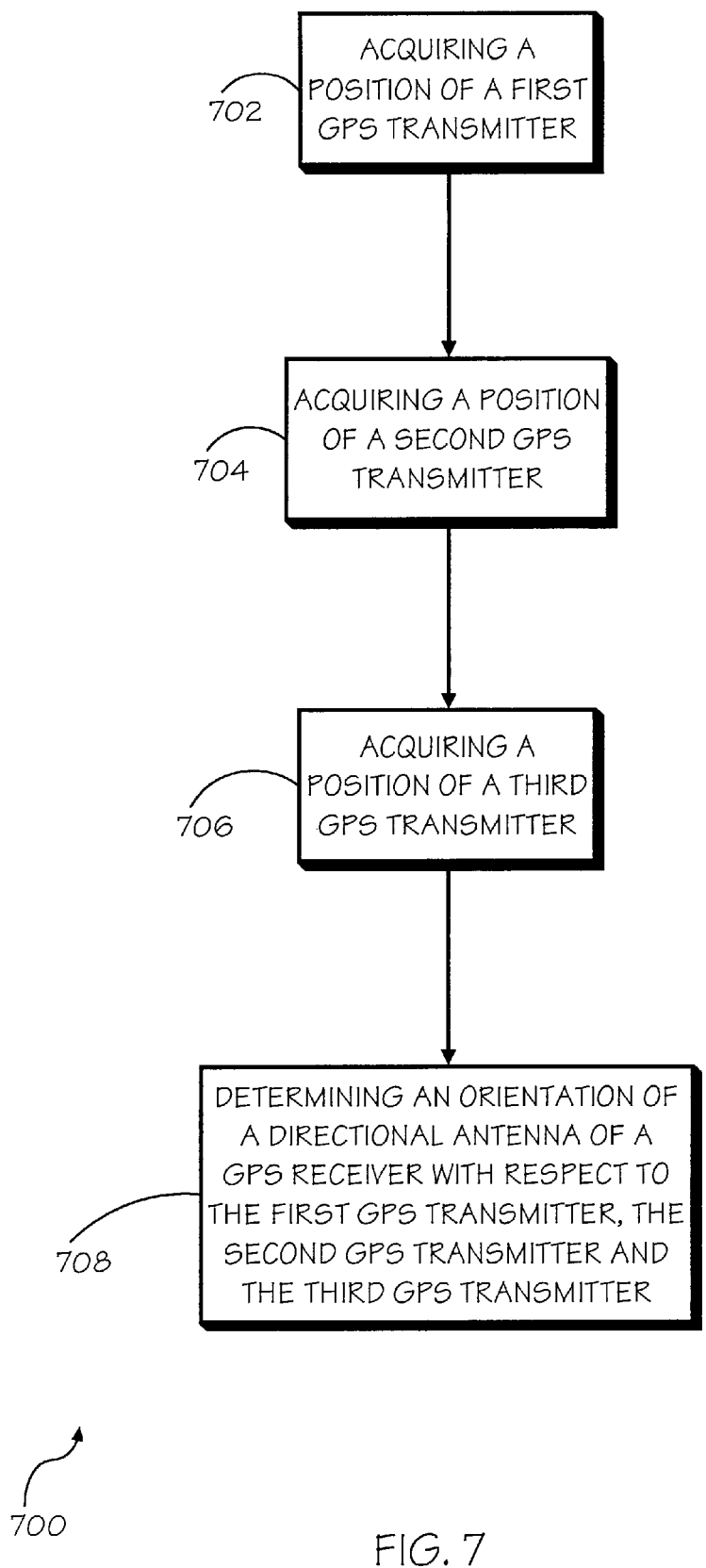
FIG. 7 is a flow diagram depicting an exemplary method of the present invention wherein a global positioning system receiver including a directional antenna is capable of determining an orientation by determining an orientation of the receiver with respect to three global positioning system transmitters.

Referring now to FIG. 7, an exemplary method 700 of the present invention is shown wherein a global positioning system receiver including a directional antenna is capable of determining an orientation by determining an orientation of the directional antenna with respect to three global positioning system transmitters. A position of a first GPS transmitter 702, a second GPS transmitter 704, and a third GPS transmitter 706 is acquired. An orientation of a directional antenna of the GPS receiver is then determined with respect to the first GPS transmitter, the second GPS transmitter and the third GPS transmitter 708. Thus, the GPS receiver does not need to determine its own position nor be positioned in a known plane to determine its orientation with respect to the GPS transmitters.

It is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the apparatus and method of determining an orientation of a global positioning system receiver of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of determining an orientation of an object including a directional antenna of a global positioning system receiver, comprising:

acquiring a position of a global positioning system transmitter; and determining an orientation of the directional antenna of the global positioning system transmitter by determining a portion of the directional antenna which receives a signal from the global positioning system transmitter, wherein the orientation of the directional antenna corresponds to the object so as to enable the orientation of the object to be determined in three dimensions.

2. The method as described in claim 1, wherein the orientation of the directional antenna is capable of being determined while the directional antenna of the global positioning system receiver is stationary in space.

3. The method as described in claim 1, wherein the directional antenna includes at least one of a nulling antenna and a beam steering antenna suitable for determining the orientation of directional antenna with respect to the global positioning system.

4. The method as described in claim 1, further comprising resolving a position of the directional antenna of the global positioning system receiver so that the orientation of the directional antenna with respect to the global positioning system transmitter is suitable for being utilized for figuring an orientation of the directional antenna in space.

5. The method as described in claim 1, further comprising computing a directional alignment of a reference point with respect to the directional antenna, wherein the directional alignment is computed by determining an angle between the position of the directional antenna and the global positioning system transmitter and the reference point.

6. The method as described in claim 5, wherein the reference point is included as a part of a global positioning system receiver.

7. The method as described in claim 5, wherein the directional alignment corresponds to at least one of a horizontal heading and a vertical heading.

8. An apparatus for determining an orientation relative to a global positioning system transmitter, comprising:

a global positioning system receiver suitable for acquiring a position of the global positioning system receiver by receiving signals from the global positioning system transmitter and also suitable for resolving a position of the global positioning system transmitter by receiving signals from the global positioning system transmitter; and a directional antenna suitable for determining the orientation of the apparatus with respect to a first global positioning system transmitter and a second global positioning system transmitter.

9. The apparatus as described in claim 8, wherein the orientation of the apparatus is capable of being determined while the apparatus is stationary in space.

10. The apparatus as described in claim 8, wherein the directional antenna includes at least one of a beam steering antenna and a nulling antenna.

11. The apparatus as described in claim 8, wherein orientation is in at least one of two dimensions and three dimensions.

12. The apparatus as described in claim 8, wherein the directional antenna is suitable for computing a directional alignment of a reference point with respect to the apparatus, wherein the directional alignment is computed by determining an angle between the position of the global positioning system transmitter and the directional antenna and the reference point.

13. The apparatus as described in claim 12, wherein the directional alignment corresponds to at least one of a horizontal heading and a vertical heading.

14. A method of determining an orientation of a directional antenna of a global positioning system receiver, comprising:

positioning the global positioning system receiver in a known plane;

acquiring a position of a first global positioning system transmitter;

acquiring a position of a second global positioning system transmitter; and determining an orientation of the directional antenna of the global positioning system receiver with respect to the first global positioning system transmitter and the second global positioning system transmitter.

15. The method as described in claim 14, wherein the plane is user specified.

16. The method as described in claim 14, wherein the orientation of global positioning system receiver is capable of being determined while the directional antenna of the global positioning system receiver is stationary in space.

17. The method as described in claim 14, wherein the directional antenna includes at least one of a beam steering antenna and a nulling antenna.

18. The method as described in claim 14, further comprising computing a directional alignment of a reference point with respect to the global positioning receiver, wherein the directional alignment is computed by determining an angle between the position of at least one of the first global positioning system transmitter and the second global positioning system transmitter; and the directional antenna and the reference point.

19. The method as described in claim 18, wherein the reference point is capable of being user specified.

20. The method as described in claim 1, wherein determining an orientation of the object in three dimensions includes at least one of:

determining a position of the global positioning system receiver and determining an orientation of the directional antenna with respect to a first global positioning system transmitter and a second global positioning system transmitter; and determining an orientation of the object in three dimensions includes determining an orientation of the directional antenna with respect to a first global positioning system transmitter, a second global positioning system transmitter and a third global positioning system transmitter.

* * * * *